(No Model.) 2 Sheets—Sheet 1.
E. SHOWELL.
COMBINED PULVERIZER AND PLANTER.
No. 520,454. Patented May 29, 1894.
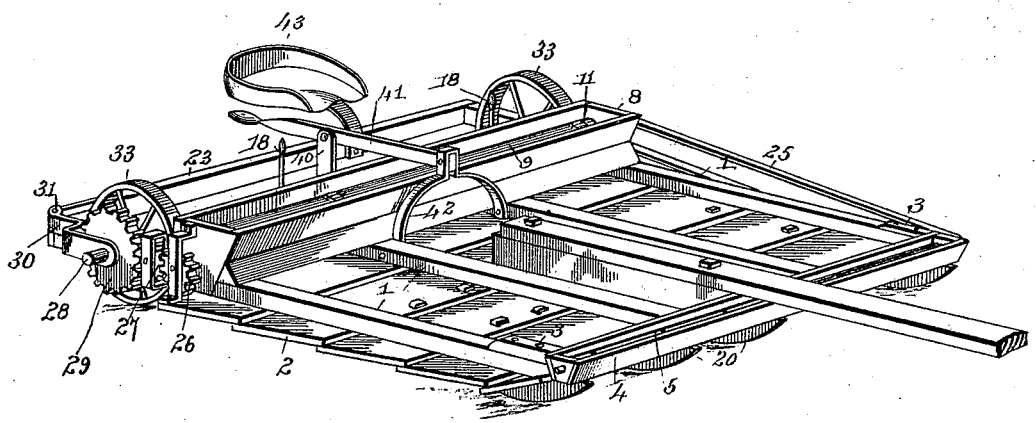
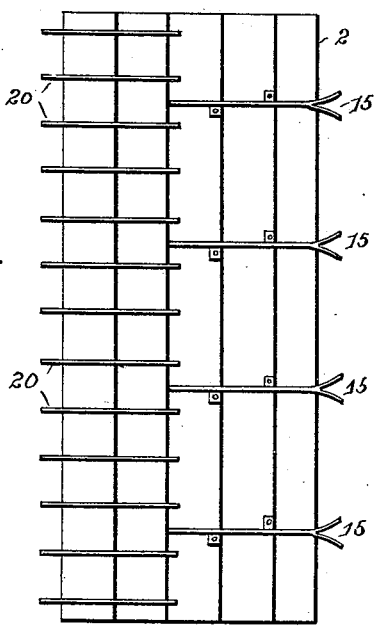
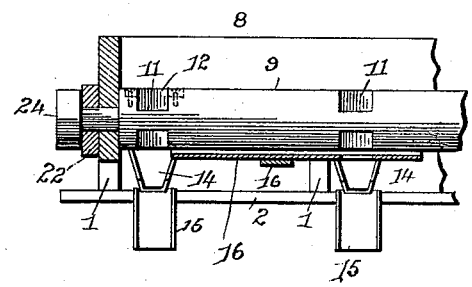
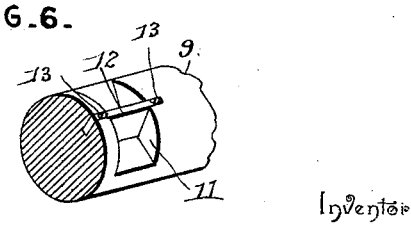
Witnesses:
Jas. K. McCathran
W. S. Duvall
Inventor
Edward Showell
By his Attorneys,
C. A. Snow & Co.

(No Model.) 2 Sheets—Sheet 2.
E. SHOWELL.
COMBINED PULVERIZER AND PLANTER.
No. 520,454. Patented May 29, 1894.
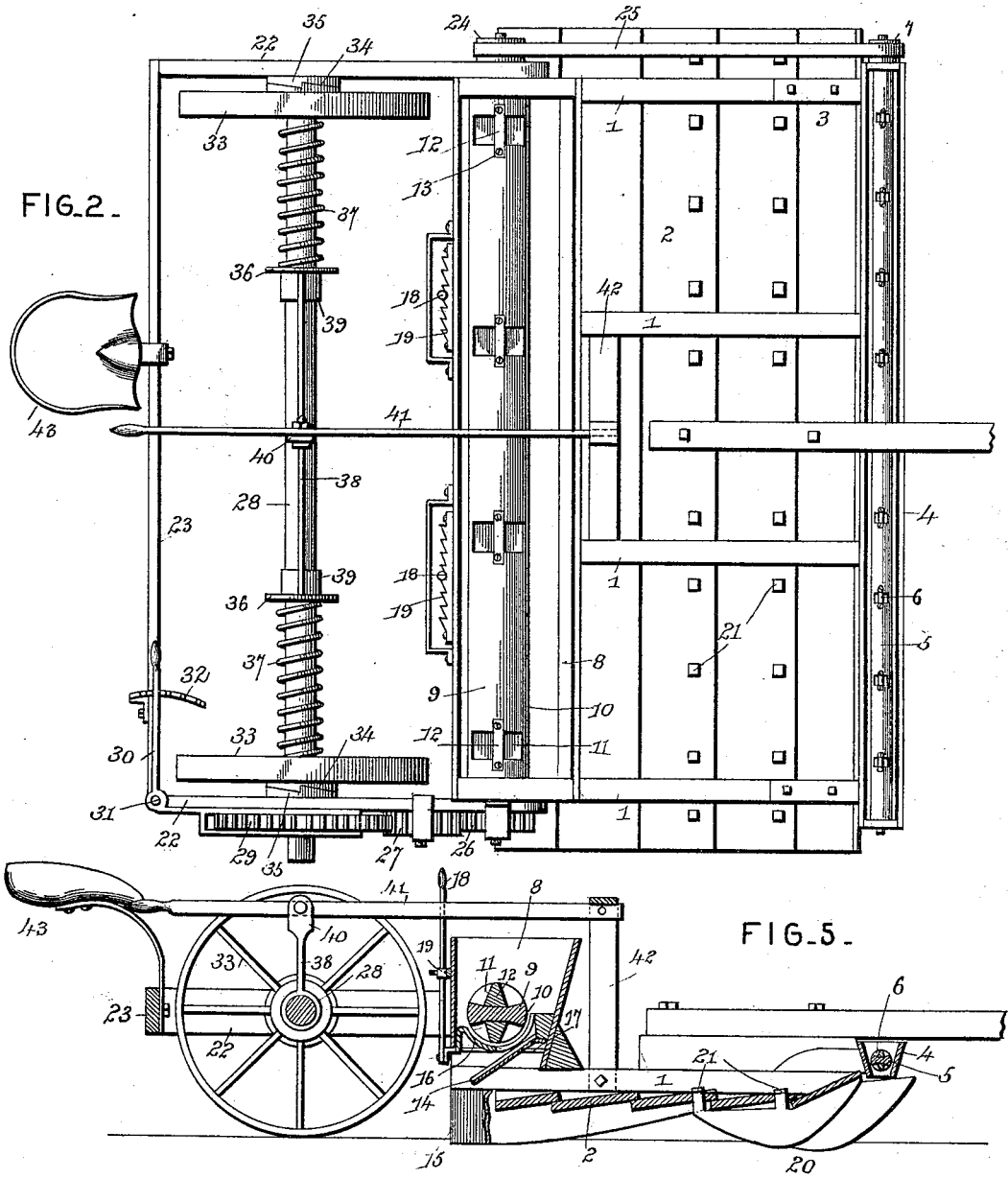
Witnesses:
Jas. K. McLathran
W. S. Duvall
Inventor
Edward Showell
By his Attorneys.
C. A. Snow & Co.
THE NATIONAL LITHOGRAPHING COMPANY,
WASHINGTON, D. C.

UNITED STATES PATENT OFFICE.

EDWARD SHOWELL, OF ATCHISON, KANSAS.

COMBINED PULVERIZER AND PLANTER.

SPECIFICATION forming part of Letters Patent No. 520,454, dated May 29, 1894.

Application filed July 7, 1893. Serial No. 479,844. (No model.)

*To all whom it may concern:*

Be it known that I, EDWARD SHOWELL, a citizen of the United States, residing at Atchison, in the county of Atchison and State of Kansas, have invented a new and useful Combined Planter and Pulverizer, of which the following is a specification.

My invention relates to improvements in agricultural-machines, and has special reference to that class thereof adapted to pulverize the soil simultaneous with planting or drilling seed therein.

The objects of my invention are to provide a machine of cheap and simple construction adapted to accomplish the above functions and also to plant or distribute grass-seed; to accomplish the planting or drilling in predetermined quantities; to provide for a raising and lowering of the pulverizing agents, and for a throwing into and out of operative position the planting and drilling-mechanisms.

Other objects and advantages of the invention will appear in the following description, and the novel features thereof will be particularly pointed out in the claims.

Referring to the drawings:—Figure 1 is a perspective view of a machine embodying my invention. Fig. 2 is a top plan view. Fig. 3 is a bottom plan of the pulverizer platform. Fig. 4 is a transverse vertical sectional view. Fig. 5 is a longitudinal sectional view through the seed boxes or hopper. Fig. 6 is a detail of a portion of the feed-shaft.

Like numerals of reference indicate like parts in all the figures of the drawings.

To the under side of a series of longitudinally disposed and aligning beams 1, I secure a series of cross-strips or planks 2, the same being set in lap-joint fashion after the manner of an ordinary clapboard-wall. Upon the upper side and at the forward ends of the beams 1 projecting brackets 3 are seated, and the same support a transversely disposed narrow hopper 4, adapted to receive grass-seed and the like. This hopper 4 has journaled therein the revoluble feed-shaft 5, and said shaft is provided at intervals with angular recesses or seed-cups 6. The bottom of the hopper is open, and as the shaft revolves the seed contained in said cups is dropped through said open bottom. One end of the revoluble shaft 5 projects beyond the hopper wall and is provided with a small pulley 7, which is rotated through the medium of a belt and other gear arrangement to be hereinafter described.

Upon the rear ends of the beams 1 a transverse main-hopper 8 is located, the same having journaled in its opposite end-walls the revoluble feed-shaft 9, which shaft fits in an opening or slot 10 formed in the bottom of the hopper and is provided at intervals with an annular series of angular recesses or seed-cups 11. The capacity of these cups may be increased or diminished by locating in said cups angular filling-blocks 12, which are temporarily retained in position through the medium of screws 13 and conform to the configuration of the seed-cups 11 of the shaft 9. Depending from points below these annular series of seed-cups are seed-spouts 14, and the same terminate in rear of the bifurcated ends of the drill-shoes or runners 15 which are located upon the under side of the front platform at intervals agreeing with those of the seed-cups and the seed-spouts.

Applied to the under side of the revoluble roller or shaft 9 are semicircular reciprocating cut-offs 16, two being in this instance employed, and each covering a series of seed-cups. These cut-offs 16 are supported in transverse keepers 17 and have attached thereto levers 18 which extend rearward and upward to a point in rear and above the aforesaid main-hopper 8. Secured to the back wall of the hopper are two notched locking-bars 19 into any one of which notches thereof the said levers 18 may be engaged, so that the cut-offs 16 may operate to cover more or less of the seed-cups and hence regulate the out-put per acre of the seed.

Upon the under side of the front platform there is located a transverse series of longitudinally disposed pulverizing-knives 20, the same being rounded upon their lower sides and formed of steel, the ends of said knives extending a few inches beyond the front end of the platform and being arranged as close together as may be desired. These knives may be secured in position in any suitable manner, but in the present instance have extending upwardly therefrom tangs 21 which pass through openings formed in the planks 2, and are bent in reverse directions above said planks. The ends of the feed-shaft 9 project beyond the end walls of the main-hopper 8, and they have loosely connected thereto rearwardly extending frame-bars 22, which in turn have their rear ends connected by a transverse frame-bar 23. One end of the said shaft is provided with a pulley 24, and the same is connected with the pulley 7 of the revoluble feed-shaft 5 by means of an endless belt 25, so that motion may be communicated from the revoluble feed-shaft of the main-hopper to that of the secondary or front hopper. The remaining end of the revoluble shaft 9 is provided with a gear-wheel 26, and the same engages with an intermediate gear-wheel 27 which is located upon the adjacent frame-bar 22 and journaled upon a suitable stub-shaft extending therefrom.

Bearings are formed in the frame-bars 22, transversely opposite each other, and in said bearings there is journaled a transverse axle 28. This axle 28 extends at one end, namely, that adjacent to the gear 27, beyond the frame-bar 22 and has mounted thereon and adapted to rotate therewith a shifting-gear 29. This gear 29 is splined upon the axle, so as to rotate therewith and yet be capable of reciprocation. A crank lever 30 is pivoted at its angle, as at 31, to the point of juncture between the frame-bars 22 and 23, and at its front end loosely engages the aforesaid gear 29, while its rear end is arranged adjustably in a toothed or notched locking-standard 32 with which the rear frame bar 23 is provided. Thus it will be seen that through a manipulation of the lever 30 the gear 29 may be thrown into and out of engagement with the intermediate gear 27, and thus motion may be derived from the axle and transmitted to the gears 27 and 26, and from thence to the revoluble shaft of the main-hopper, and through the medium of the pulleys 24 and 7 and their connecting belt to the revoluble feed-shaft of the auxiliary-hopper; or, on the other hand, such motion may be obviated by simply throwing the gear 29 out of mesh or engagement with the intermediate gear.

Ground-wheels 33 are located loosely upon the axle 28, and the same have their hubs provided at their outer sides with inclined ratchet teeth 34, which are disposed opposite to similar ratchet teeth formed on disks 35 made fast upon the said axle at the outer sides of the wheels. Collars 36 are located between the ground-wheels upon the axle and adjacent to said ground-wheels, and coiled-springs 37 encircle the axle and are interposed between the collars and the inner ends of the hubs of the ground-wheels so that the said wheels are forced normally toward the ratchet disks 35, and when the wheels rotate so that the machine moves forward they engage with the teeth of said ratchet disks and hence move the axle and the mechanism, but on the contrary, when the ground-wheels 33 move in such direction as to carry the machine backward, the teeth thereof ride idly over the teeth of the ratchet-disks and hence the axle is not rotated nor any of the mechanism connected therewith. A yoke 38 terminates in eyes 39 that embrace the axle between the collars 36, and the upper side of said yoke has rising therefrom a standard 40. Upon this standard is fulcrumed a lever 41 which extends to the rear of the machine and also to a point slightly beyond the main-hopper 8 at which front end it is loosely connected with the upper end of an inverted U-shaped bail 42 which rises from two of the intermediate beams 1.

A seat 43 may be located upon the frame bar 23, and it will be seen that a driver thereon may readily reach all the various levers, either for raising and lowering the front platform out of and into operative position or shutting off and regulating the flow of seed, or when the machine is used simply as a pulverizer or cultivator for throwing the gears out of operative position.

The operation of the machine will be obvious and requires no specific description, and it may simply be said that when employed wholly for sowing grass-seed the rear hopper is closed so that no corn or other seed contained therein may be drilled, and likewise when drilling corn or other seed from the main-hopper the endless belt that drives the feed-shaft of the auxiliary hopper is disconnected from the pulleys. In any event, however, the pulverizer knives when lowered to the ground serve to sever and pulverize all clods and render the plowed field ready for the seeding mechanism that follows, which latter operates after the manner of the ordinary seed-drill. Thus it will be seen that I have combined in one machine the functions of several, each one successively accomplishing its function and requiring no changes for adapting it to its different purposes.

Changes in the form, proportion, and minor details of construction may be resorted to without departing from the principle or sacrificing any of the advantages of this invention.

Having described my invention, what I claim is—

1. In a machine of the class described, the combination with the front frame, the platform arranged thereunder, the series of longitudinally disposed and transversely arranged pulverizing-blades arranged at the front end of the platform, the drill-shoes arranged at the rear end of the same, a hopper arranged at the front and rear end of the platform, the latter being above the drill-shoes, feed-devices mounted in the hoppers, means for driving the feed-devices of the rear hopper, and intermediate mechanism between said feed devices of the main hopper and those of the front hopper, substantially as specified.

2. In a machine of the class described, the combination with the front framework, the platform, and pulverizers carried thereby, and the hopper arranged thereover of a rear pivoted frame, a transverse axle journaled in the pivoted frame, a bail rising from the front frame, a yoke arranged upon the axle and having eyes engaging the same, and a lever fulcrumed on the yoke and having its front end extended and loosely connected with the bail, substantially as specified.

3. In a machine of the class described, the combination with the front frame carrying the pulverizer, the superimposed hopper, the feed-shaft arranged therein and extending beyond the end walls of the hopper, of the frame bars 22 loosely mounted upon the ends of the shafts the rear frame-bar 23, the transverse axle journaled in the bars 22, the ratchet-disks 35 mounted on the axle, the ground-wheels having their outer faces provided with oppositely disposed teeth for engaging the ratchets and loosely mounted on the axle, coiled springs arranged at the inner sides of the ground-wheels, collars between the wheels against which the springs abut, a gear-wheel carried by the outer end of the axle, a gear-wheel mounted on the feed-shaft of the hopper, and an intermediate gear-wheel for communicating motion from the gear wheel of the axle to that of the feed-shaft, substantially as specified.

4. In a machine of the class described, the combination with the front platform, the framework carrying the pulverizing devices, and the hopper arranged thereover and provided with a feed-shaft extending beyond its ends, of a rear rectangular frame loosely connected at its terminals to said feed shaft, an axle journaled in the rectangular frame, ground wheels carried by the axle and adapted to rotate therewith, a gear loosely mounted on the outer end of the axle, an angular lever engaging the gear and adapted to reciprocate the same, a locking-bar for said angular lever, a gear wheel carried by the feed-shaft of the hopper, and an intermediate gear mounted upon the frame and adapted to communicate motion from the shifting gear to the gear of the feed-shaft, substantially as specified.

5. In a pulverizer, the combination of the beams 1, with the cross planks 2 arranged in lap-joint fashion, and the pulverizing knives 20 arranged at the front of the cross-planks and provided with rounded lower sides, and two or more tangs 21 formed on the upper edges of the knives and passing through openings of the planks to secure the knives thereto, substantially as described.

In testimony that I claim the foregoing as my own I have hereto affixed my signature in the presence of two witnesses.

EDWARD SHOWELL.

Witnesses:
J. W. TRUESDELL,
CYRUS MARLOTT.